United States Patent
Lee et al.

(10) Patent No.: US 8,483,542 B2
(45) Date of Patent: Jul. 9, 2013

(54) IMAGE PROCESSING DEVICE AND METHOD

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 218 days.

(21) Appl. No.: 13/190,496

(22) Filed: Jul. 26, 2011

(65) Prior Publication Data
US 2012/0106931 A1    May 3, 2012

(30) Foreign Application Priority Data
Oct. 27, 2010   (TW) .............................. 99136625 A

(51) Int. Cl.
*H04N 5/77*   (2006.01)
(52) U.S. Cl.
USPC .......................................... 386/224; 386/242
(58) Field of Classification Search
USPC ......................... 386/200, 224, 242
See application file for complete search history.

(56) References Cited

U.S. PATENT DOCUMENTS

| | | | |
|---|---|---|---|
| 7,646,891 B2 * | 1/2010 | Kage et al. .............. | 382/107 |
| 2007/0098381 A1 * | 5/2007 | Oshima ..................... | 396/52 |

* cited by examiner

*Primary Examiner* — Huy T Nguyen
(74) *Attorney, Agent, or Firm* — Altis Law Group, Inc.

(57) ABSTRACT

An image processing device reads a video consisting of a plurality of image frames from a storage device. A stable region along a Y-axis direction in each image frame is determined according to pixel information of an edge row of each image frame. The device then aligns all the image frames according to the stable region along a Y-axis direction in each image frame, and trims all the image frames by cutting additional image regions excepting the stable region along the Y-axis direction in each image frame, to reduce a shaking degree of each image frame along the Y-axis direction. Furthermore, the device reduces a shaking degree of each image frame along an X-axis direction using similar method by reducing the shaking degree along the Y-axis direction. At last, the device displays stable playback of the video consisting of the aligned and trimmed image frames.

19 Claims, 7 Drawing Sheets

IMAGE PROCESSING DEVICE AND METHOD

BACKGROUND

1. Technical Field

Embodiments of the present disclosure relate to data processing systems and methods, and more particularly, to an image processing device and method.

2. Description of Related Art

As video capture devices, such as video cameras, have become more accessible, many users now use them to record numerous events. However, one problem with many recorded videos is that the recorded videos may include shaking which is due to a user inadvertently shaking or making other undesirable movements. At present, a whole region scanning method is often used to reduce shaking of videos. The whole region scanning method compares all pixel information of each image frame of the video, to search a stable image region in each image frame, and then aligns all image frames based on the stable image region in each image frame, to realize a reduced shaking degree of the video. However, one problem with the method is that the whole region scanning method is computationally expensive.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
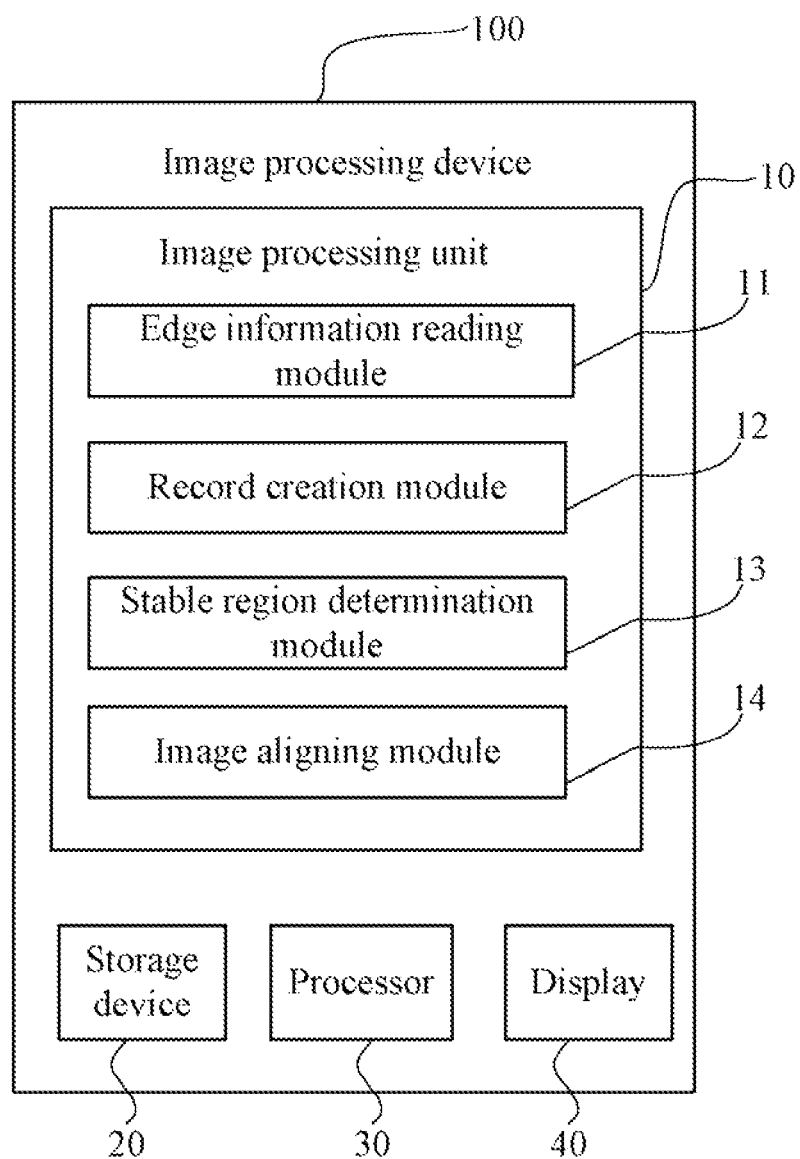
FIG. 1 is a block diagram of one embodiment of function modules of an image processing device.

FIG. 1 is a block diagram of one embodiment of function modules of an image processing device 100. The image processing device 100 includes an image processing unit 10, a storage device 20, a processor 30, and a display 40. Depending on the embodiment, the image processing device 100 may be a digital video, a computer, or any other suitable electronic device. The storage device 20 stores one or more videos. The image processing unit 10 processes a video consisting of a plurality of consecutive image frames, to reduce shaking of the video and generate stable playback of the video. The display 40 displays the video before processing by the image processing unit 10, and displays the generated stable playback of the video.

In one embodiment, the image processing unit 10 includes an edge information reading module 11, a record creation module 12, a stable region determination module 13, and an image aligning module 14. The modules 11-14 may comprise computerized code in the form of one or more programs that are stored in the storage device 20. The computerized code includes instructions that are executed by the processor 30 to provide the below described functions of the modules 11-14 illustrated in FIG. 2A and FIG. 2B.

Figure 2A:
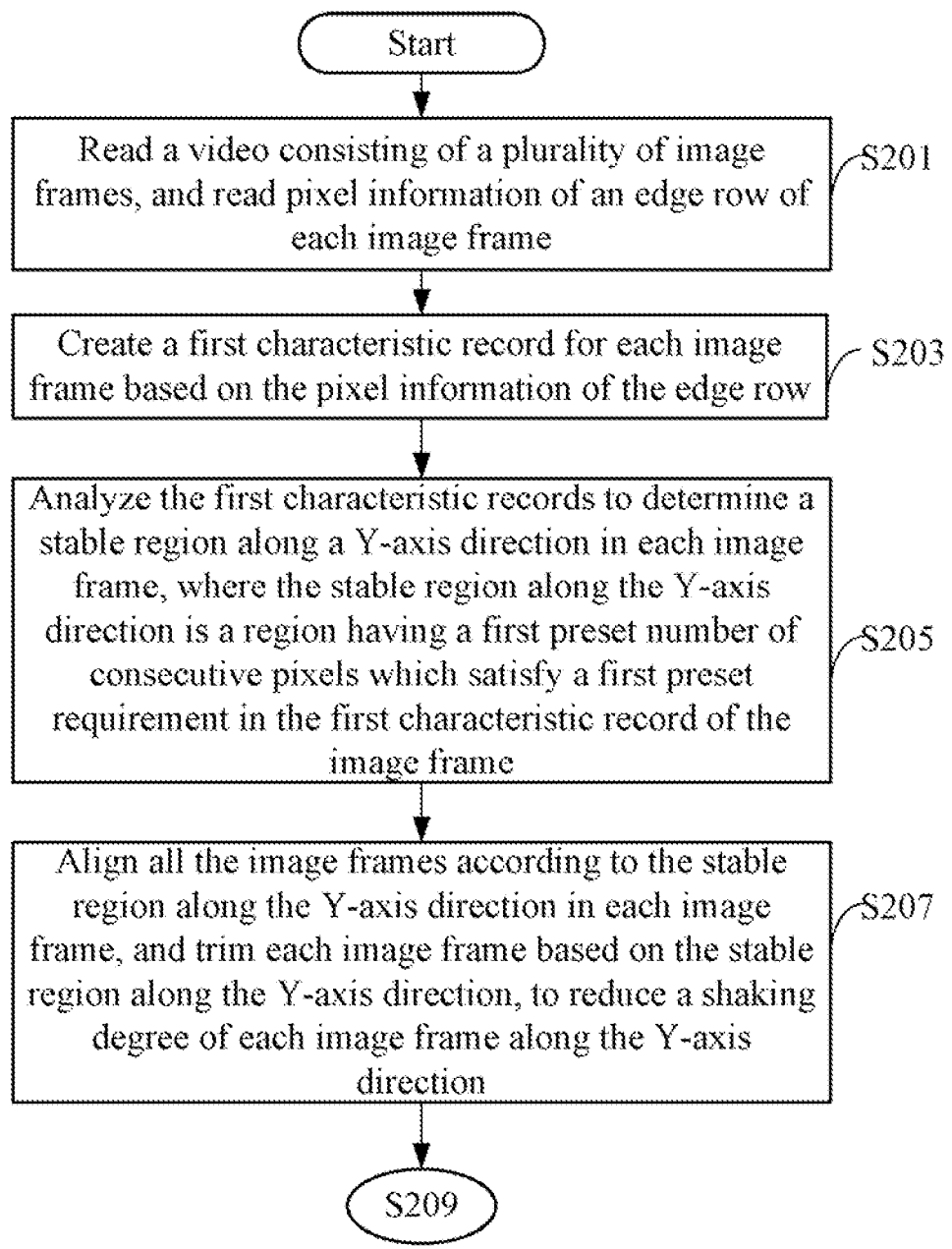
FIG. 2A and FIG. 2B is a block diagram of one embodiment of an image processing method.
Figure 2B:
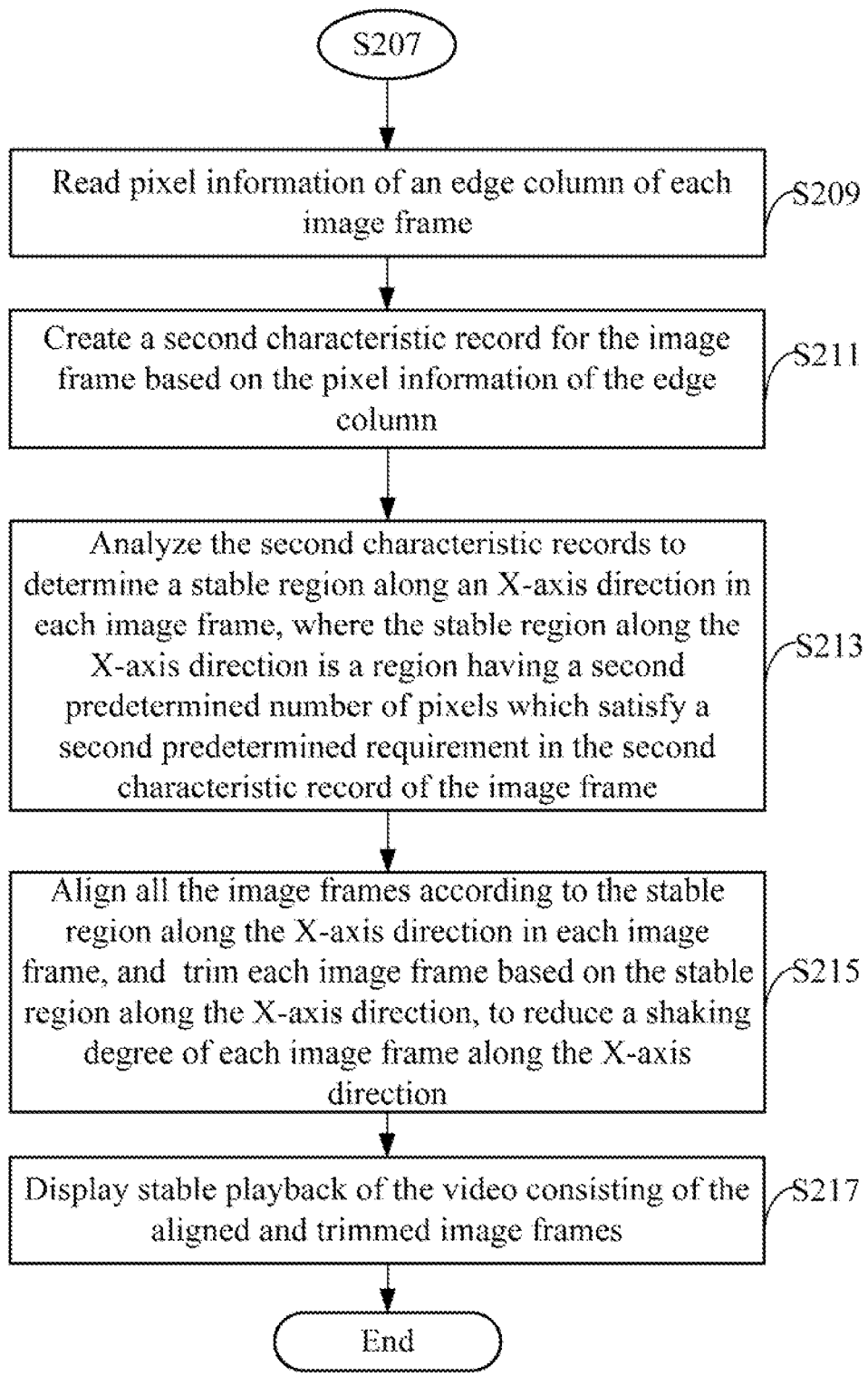

FIG. 2A and FIG. 2B are a flowchart of one embodiment of an image processing method. Depending on the embodiment, additional blocks may be added, others removed, and the ordering of the blocks may be changed.

Figure 3:
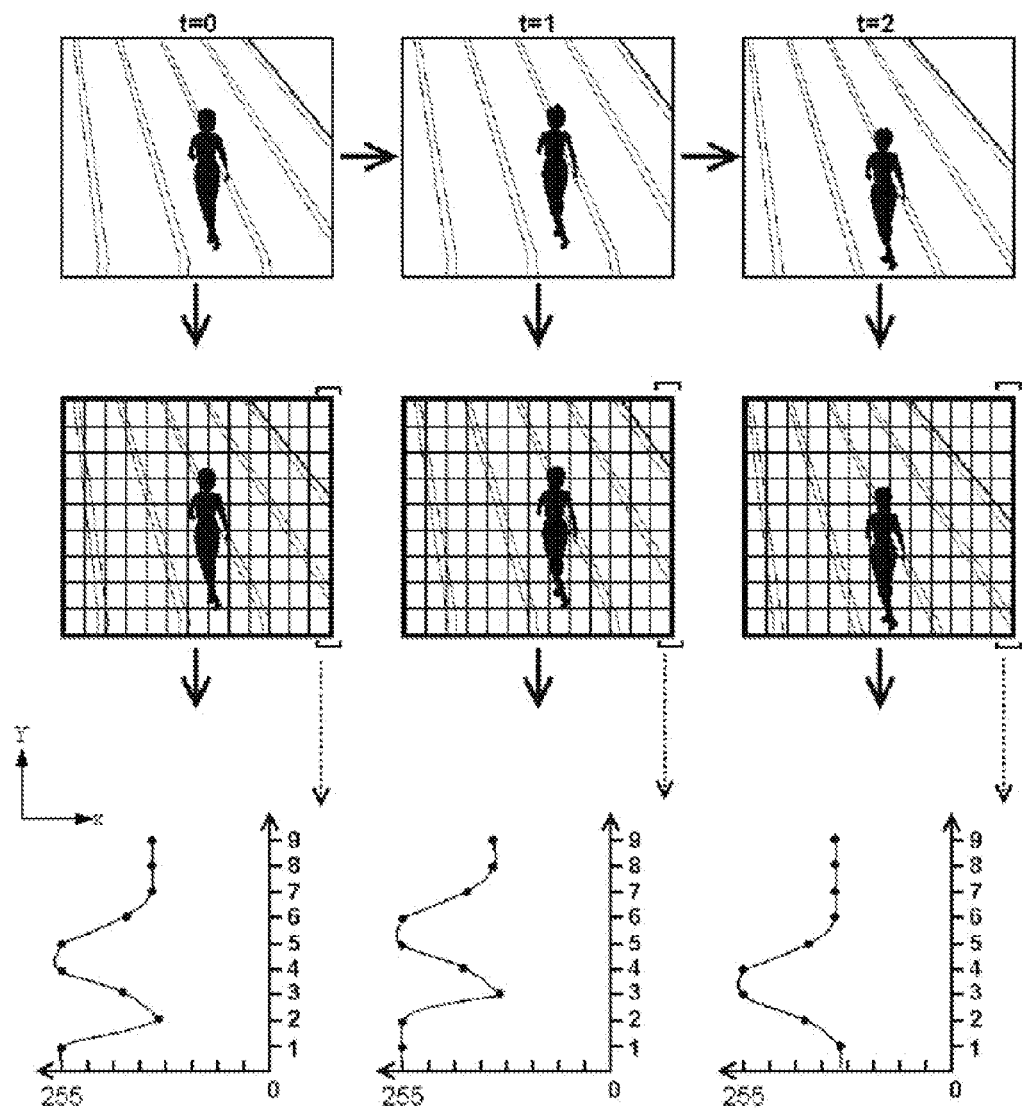
FIGS. 3-6 are examples for reducing shaking of a video using the image processing device and method.

In block S201, the edge information reading module 11 reads a video from the storage device 20 that consists of a plurality of image frames, and reads pixel information of an edge row of each image frame. FIG. 3 shows three image frames of a video captured at time $t=0$, $t=1$, and $t=2$ respectively. If each image frame has a resolution of 320 pixel×240 pixel, then 240 pixels are distributed in each row (a line parallel to the Y-axis) of the image frame, and 320 pixels are distributed in each column (a line parallel to the X-axis) of the image frame. In FIG. 3, intersection points of the rows and columns represent the pixels. In this embodiment, as shown in FIG. 3, the edge row is defined as the right side edge row, which is labeled by square brackets "[ ]". The pixel information of the edge row may include an amount (e.g., 240) of pixels distributed in the edge row, a number (e.g., 1, 2, 3 . . . ) of each pixel, and a gray value (0-255) of each pixel distributed in the edge row. In other embodiments, the edge row may be defined as the left side edge row.

In block S203, the record creation module 12 creates a first characteristic record for each image frame based on read pixel information of the edge row. In one embodiment, the first characteristic record of each image frame records the amount of pixels distributed in the edge row, the number of each pixel, the gray value of each pixel, and a gray value difference of two neighboring pixels distributed in the edge row. The record creation module 12 further generates a characteristic curve diagram for the edge row according to the first characteristic record of each image frame. For example, as shown in FIG. 3, the record creation module 12 respectively generates a characteristic curve diagram for the right side edge row of the image frame labeled as $t=0$, $t=1$, and $t=2$. The characteristic curve diagrams for the edge rows are more intuitionistic, and may help to analyze the first characteristic records.

In block S205, the stable region determination module 13 analyzes the first characteristic records of the image frames, to determine a stable region along the Y-axis direction in each image frame, where the stable region along the Y-axis direction is an image region that has a first preset number (e.g., N1) of consecutive pixels, which satisfy a first preset requirement, in the first characteristic record of the image frame. For example, if the first preset number is seven, the first preset requirement is defined as a threshold T1 (e.g., $a1<T1<b1$) of a gray value difference of each two neighboring pixels in the seven consecutive pixels, the stable region determination module 13 analyzes each first characteristic record of the image frames labeled as $t=0$, $t=1$, and $t=2$, to search the seven consecutive pixels, where the gray value difference of each two neighboring pixels in the seven consecutive pixels is more than a1 and less than b1.

During the process of determining the stable region along the Y-axis direction in an image frame, one situation that may appear is that a number M1 of consecutive pixels satisfying the first preset requirement may be searched in a first characteristic record, but $M1<N1$. In this situation, the stable region determination module 13 may add corresponding number (e.g., N1−M1) of pixels having corresponding gray values to the first characteristic record, so that the first characteristic record has the first preset number of consecutive pixels satisfying the first preset requirement. For example, in the first characteristic record of the image frame labeled as t=0, five consecutive pixels satisfying the first preset requirement have been searched, but the first preset number is seven. Then, the stable region determination module 13 adds two pixels to the first characteristic record of the image frame labeled as t=0, where a gray value difference between either added pixel and any other pixel selected from the total seven pixels is more than a1 and less than b1.

Figure 4:
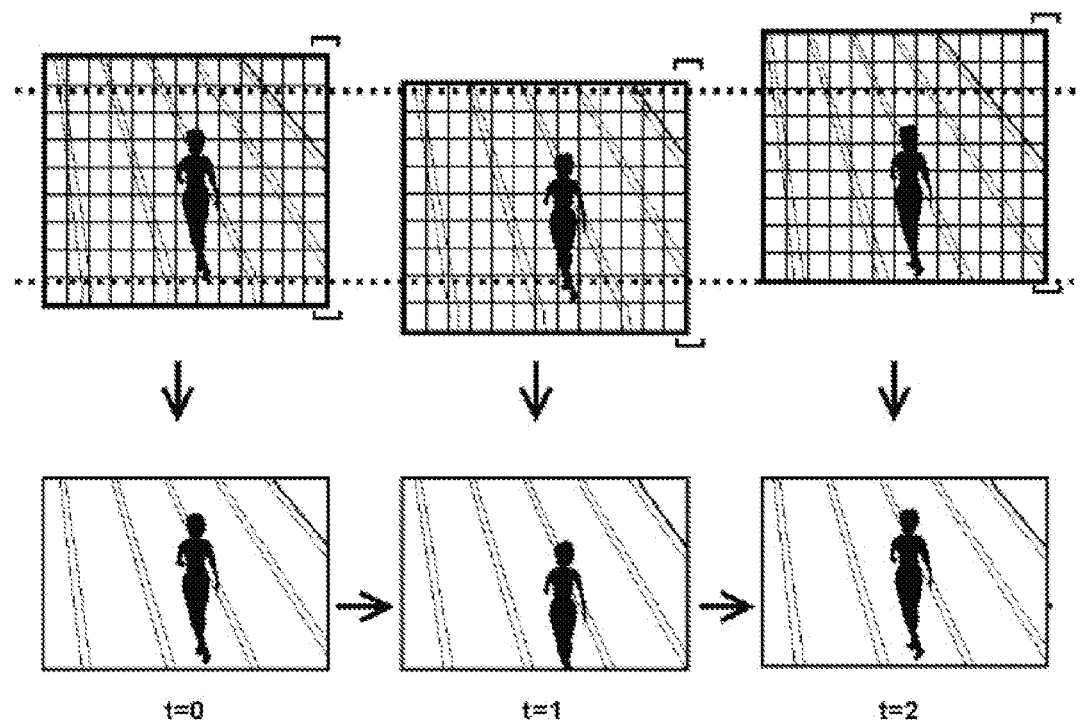

In block S207, the image aligning module 14 aligns all the image frames according to the stable region along the Y-axis direction in each image frame, and trims all the image frame by cutting additional image regions excepting the stable region along the Y-axis direction in each image frame, to reduce a shaking degree of each image frame along the Y-axis direction. For example, as shown in FIG. 4, an image region between two broken lines in an image frame, such as the image frame labeled as t=0, t=1, or t=2, along the X-axis direction, is the stable region along the Y-axis direction in the image frame. The image aligning module 14 aligns the image frames labeled as t=0, t=1, and t=2 according to the stable region, and cuts additional image regions in the image frames labeled as t=0, t=1, and t=2, to obtain three processed image frames shown below three arrows in FIG. 4.

Figure 5:
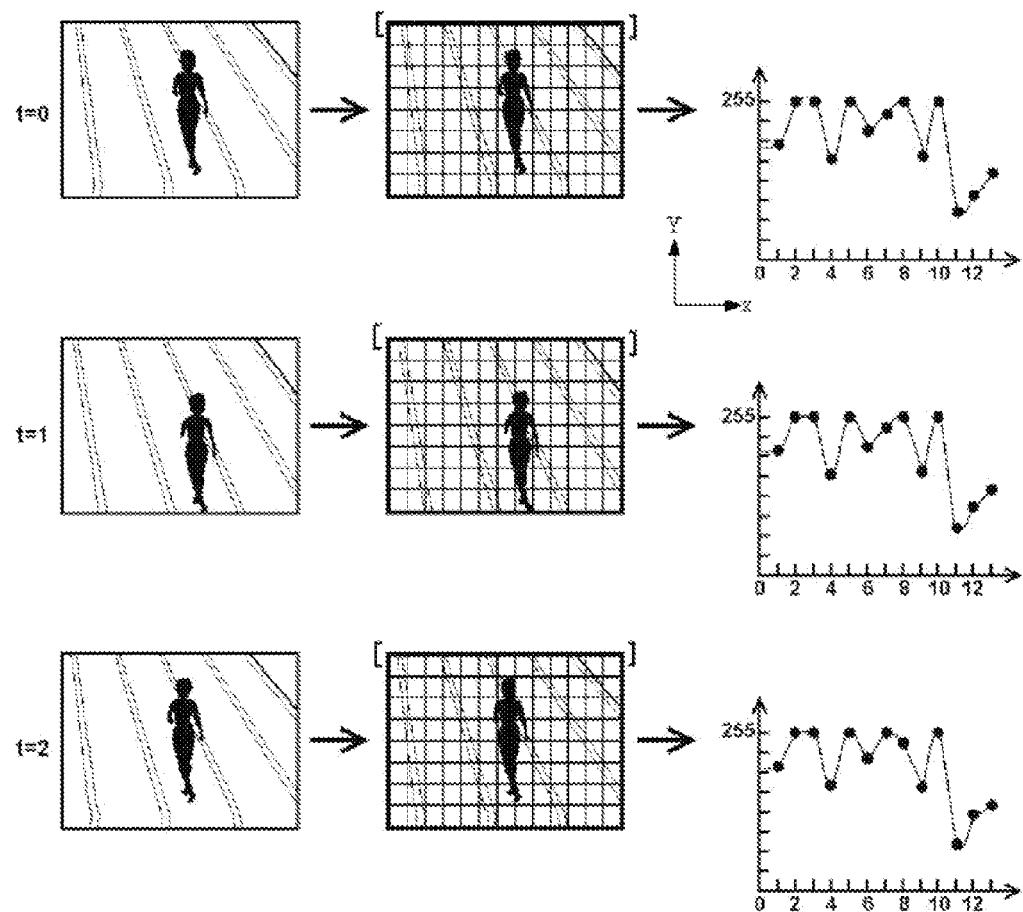

In block S209, the edge information reading module 11 reads pixel information of an edge column of each image frame. In this embodiment, as shown in FIG. 5, the edge column is defined as the upside edge column, which is labeled by square brackets "[ ]". The pixel information of the edge column may include an amount (e.g., 320) of pixels distributed in the edge column, a number (e.g., 1, 2, 3 . . . ) of each pixel, and a gray value (0-255) of each pixel. In other embodiment, the edge column may be defined as the lower side edge column.

In block S211, the record creation module 12 creates a second characteristic record for each image frame based on the read pixel information of the edge column. In one embodiment, the second characteristic record of each image frame records the amount of pixels distributed in the edge column, the number of each pixel, the gray value of each pixel, and a gray value difference of two neighboring pixels distributed in the edge column. The record creation module 12 further generates a characteristic curve diagram for the edge column according to the second characteristic record. For example, as shown in FIG. 5, the record creation module 12 respectively generates a characteristic curve diagram for the upside edge column of the image frame labeled as t=0, t=1, and t=2.

In block S213, the stable region determination module 13 analyzes the second characteristic records of the image frames, to determine a stable region along the X-axis direction in each image frame, where each stable region along the X-axis direction is an image region that has a second preset number (e.g., N2) of consecutive pixels, which satisfy a second preset requirement, in the second characteristic record of the image frame. For example, if the second preset number is ten, the second preset requirement is defined as a threshold T2 (e.g., a2<T2<b2) of a gray value difference of each two neighboring pixels in the ten consecutive pixels, the stable region determination module 13 analyzes each second characteristic record of the image frames labeled as t=0, t=1, and t=2, to search the ten consecutive pixels, where the gray value difference of each two neighboring pixels in the ten consecutive pixels is more than a2 and less than b2.

During the process of determining the stable region along the X-axis direction in an image frame, one situation may appear, that is, number M2 of consecutive pixels satisfying the second preset requirement may be searched, but M2<N2. In this situation, the stable region determination module 13 may add corresponding number (e.g., N2−M2) of pixels having corresponding gray values to the second characteristic record of the image frame, so that the second characteristic record of the edge column has the second preset number of consecutive pixels satisfying the second preset requirement.

Figure 6:
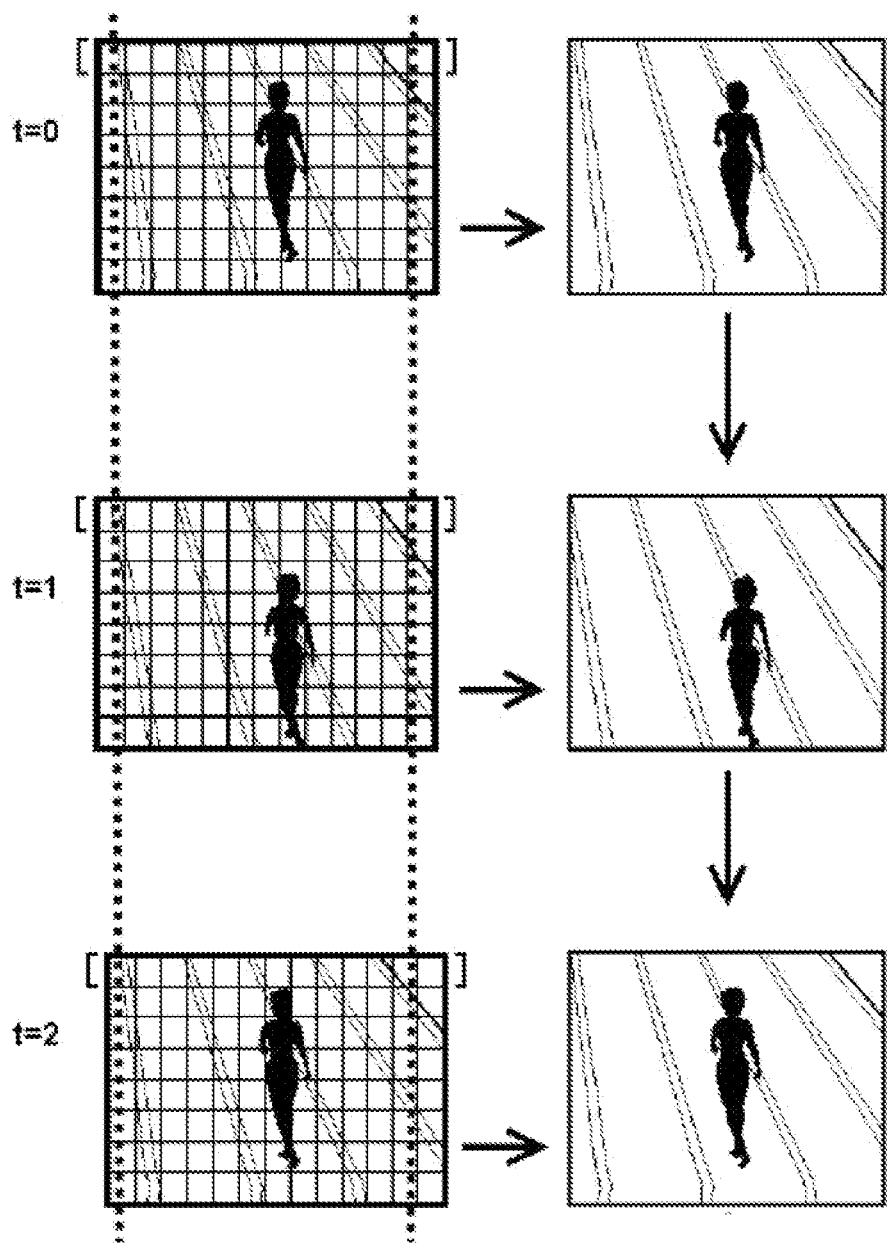

In block S215, the image aligning module 14 aligns all the image frames according to the stable region along the X-axis direction in each image frame, and trims all the image frames by cutting additional image regions excepting the stable region along the X-axis direction in each image frame, to reduce a shaking degree of each image frame along the X-axis direction. For example, as shown in FIG. 6, an image region between two broken lines in an image frame, such as the image frame labeled as t=0, t=1, or t=2, along the Y-axis direction, is the stable region along the X-axis direction in the image frame. The image aligning module 14 aligns the image frames labeled as t=0, t=1, and t=2 according to the stable region, and cuts additional image regions in the image frames labeled as t=0, t=1, and t=2, to obtain three processed image frames shown followed three arrows in FIG. 6.

In block S217, the display 40 displays stable playback of the video consisting of the aligned and trimmed image frames.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An image processing method, comprising:
   reading a video consisting of a plurality of image frames from a storage device of an image processing device;
   reading pixel information of an edge row of each image frame;
   determining a stable region along a Y-axis direction in each image frame according to the pixel information of the edge row;
   aligning all the image frames according to the stable region along the Y-axis direction in each image frame, and trimming all the image frames by cutting additional image regions except for the stable region along the Y-axis direction in each image frame, to reduce a shaking degree of each image frame along the Y-axis direction; and
   displaying stable playback of the video consisting of the aligned and trimmed image frames.

2. The method of claim 1, before displaying further comprising:
   reading pixel information of an edge column of each image frame;
   determining a stable region along an X-axis direction in each image frame according to the pixel information of the edge column; and
   aligning all the image frames according to the stable region along the X-axis direction in each image frame, and trimming all the image frames by cutting additional image regions except for the stable region along the X-axis direction in each image frame, to reduce a shaking degree of each image frame along the X-axis direction.

3. The method of claim 1, wherein determining the stable region along the Y-axis direction in each image frame comprises:
creating a first characteristic record for each image frame based on read pixel information of the edge row; and
analyzing the first characteristic record of each image frame, to determine the stable region along the Y-axis direction in the image frame, wherein the stable region along the Y-axis direction is an image region that has a first preset number of consecutive pixels, which satisfy a first preset requirement, in the first characteristic record of the image frame.

4. The method of claim 1, wherein the pixel information of the edge row comprises an amount of pixels distributed in the edge row, a number of each pixel, and a gray value of each pixel distributed in the edge row.

5. The method of claim 2, wherein determining the stable region along the X-axis direction in each image frame comprises:
creating a second characteristic record for each image frame based on read pixel information of the edge column; and
analyzing the second characteristic record of each image frame, to determine the stable region along the X-axis direction in the image frame, wherein the stable region along the X-axis direction is an image region that has a second preset number of consecutive pixels, which satisfy a second preset requirement, in the second characteristic record of the image frame.

6. The method of claim 2, wherein the pixel information of the edge column comprises an amount of pixels distributed in the edge column, a number of each pixel, and a gray value of each pixel distributed in the edge column.

7. An image processing device, comprising:
a storage device;
a processor; and
an image processing unit comprising computerized code in the form of one or more programs, which are stored in the storage device and executable by the processor, the one or more programs comprising:
an edge information reading module operable to read a video consisting of a plurality of image frames from the storage device, and read pixel information of an edge row of each image frame;
a stable region determination module operable to determine a stable region along a Y-axis direction in each image frame according to the pixel information of the edge row; and
an image aligning module operable to align all the image frames according to the stable region along the Y-axis direction in each image frame, and trim all the image frames by cutting additional image regions except for the stable region along the Y-axis direction in each image frame, to reduce a shaking degree of each image frame along the Y-axis direction.

8. The device of claim 7, wherein the pixel information of the edge row comprises an amount of pixels distributed in the edge row, a number of each pixel, and a gray value of each pixel distributed in the edge row.

9. The device of claim 7, wherein:
the edge information reading module is further operable to read pixel information of an edge column of each image frame;
the stable region determination module is further operable to determine a stable region along an X-axis direction in each image frame according to the pixel information of the edge column; and
the image aligning module is further operable to align all the image frames according to the stable region along the X-axis direction in each image frame, and trim all the image frames by cutting additional image regions except for the stable region along the X-axis direction in each image frame, to reduce a shaking degree of each image frame along the X-axis direction.

10. The device of claim 9, wherein the pixel information of the edge column comprises an amount of pixels distributed in the edge column, a number of each pixel, and a gray value of each pixel distributed in the edge column.

11. The device of claim 9, wherein the one or more programs further comprise a record creation module operable to create a first characteristic record for each image frame based on read pixel information of the edge row; and
the stable region determination module is operable to analyze the first characteristic record of each image frame, to determine the stable region along the Y-axis direction in the image frame, wherein the stable region along the Y-axis direction is an image region that has a first preset number of consecutive pixels, which satisfy a first preset requirement, in the first characteristic record of the image frame.

12. The device of claim 11, wherein the record creation module is further operable to create a second characteristic record for each image frame based on read pixel information of the edge column; and
the stable region determination module is operable to analyze the second characteristic record of each image frame, to determine the stable region along the X-axis direction in the image frame, wherein the stable region along the X-axis direction is an image region that has a second preset number of consecutive pixels, which satisfy a second preset requirement, in the second characteristic record of the image frame.

13. The device of claim 7, further comprising a display that displays the video before processing by the device, and displays stable playback of the video consisting of the aligned and trimmed image frames.

14. A non-transitory medium storing a set of instructions, the set of instructions capable of being executed by a processor of an image processing device to perform an image processing method, the method comprising:
reading a video consisting of a plurality of image frames from a storage device of an image processing device;
reading pixel information of an edge row of each image frame;
determining a stable region along a Y-axis direction in each image frame according to the pixel information of the edge row;
aligning all the image frames according to the stable region along the Y-axis direction in each image frame, and trimming all the image frames by cutting additional image regions except for the stable region along the Y-axis direction in each image frame, to reduce a shaking degree of each image frame along the Y-axis direction; and
displaying stable playback of the video consisting of the aligned and trimmed image frames.

15. The non-transitory medium of claim 13, wherein before displaying the method further comprises:
reading pixel information of an edge column of each image frame;
determining a stable region along an X-axis direction in each image frame according to the pixel information of the edge column; and aligning all the image frames according to the stable region along the X-axis direction in each image frame, and trimming all the image frames by cutting additional image regions except for the stable region along the X-axis direction in each image frame, to reduce a shaking degree of each image frame along the X-axis direction.

16. The non-transitory medium of claim 13, wherein determining the stable region along the Y-axis direction in each image frame comprises:
  creating a first characteristic record for each image frame based on read pixel information of the edge row; and
  analyzing the first characteristic record of each image frame, to determine the stable region along the Y-axis in the image frame, wherein the stable region along the Y-axis is an image region that has a first preset number of consecutive pixels, which satisfy a first preset requirement, in the first characteristic record of the image frame.

17. The non-transitory medium of claim 13, wherein the pixel information of the edge row comprises an amount of pixels distributed in the edge row, a number of each pixel, and a gray value of each pixel distributed in the edge row.

18. The non-transitory medium of claim 14, wherein determining the stable region along the X-axis direction in each image frame comprises:
  creating a second characteristic record for each image frame based on read pixel information of the edge column; and
  analyzing the second characteristic record of each image frame, to determine the stable region along the X-axis direction in the image frame, wherein the stable region along the X-axis direction is an image region that has a second preset number of consecutive pixels, which satisfy a second preset requirement, in the second characteristic record of the image frame.

19. The non-transitory medium of claim 14, wherein the pixel information of the edge column comprises an amount of pixels distributed in the edge column, a number of each pixel, and a gray value of each pixel distributed in the edge column.

* * * * *